United States Patent
Knoblach et al.

[15] 3,686,978
[45] Aug. 29, 1972

[54] PLANTETARY REDUCTION WHEEL HUB

[72] Inventors: John C. Knoblach; Ray M. Shepard, both of Fort Wayne, Ind.

[73] Assignee: Fairfied Manufacturing Company, Inc., Lafayette, Ind.

[22] Filed: April 9, 1971

[21] Appl. No.: 132,707

[52] U.S. Cl. .................................. 74/801, 74/750 R
[51] Int. Cl. ............................. F16h 1/28, F16h 3/44
[58] Field of Search ........................... 74/801, 750 R

[56] References Cited

UNITED STATES PATENTS

| | | | |
|---|---|---|---|
| 1,632,123 | 6/1927 | Else .............................. | 74/801 |
| 1,707,877 | 4/1929 | Roberts ....................... | 74/801 |
| 1,799,740 | 4/1931 | Felton .......................... | 74/801 |
| 2,401,875 | 6/1946 | Lawler .......................... | 74/801 |
| 2,402,756 | 6/1946 | Lawler ....................... | 74/801 X |
| 3,319,492 | 5/1967 | Magnuson ................. | 74/750 R |
| 3,502,166 | 3/1970 | Christenson et al. ..... | 74/801 X |

*Primary Examiner*—Arthur T. McKeon
*Attorney*—Thomas P. Jenkins, Jack W. Hanley, Jerry E. Hyland and Ralph W. Burnett

[57] ABSTRACT

A planetary reduction drive, particularly for a vehicle wheel. A mounting flange adapted to be secured to the vehicle frame has a hollow spindle extending from one side, and a drive motor is mounted on the other side of the flange with its output shaft extending into the spindle. An input shaft is coupled to the motor shaft and extends outwardly from the spindle. A fixed ring gear surrounds the input shaft and is secured to the spindle adjacent its outer end. A housing has a first hub portion surrounding and rotatably mounted on the spindle and a second hub portion surrounding the fixed ring gear, the wheel being mounted on the housing. An output ring gear also surround the input shaft and is secured to the second hub portion of the housing. A planet carrier is positioned within the ring gears and supports at least two planet shafts, each of the planet shafts having a cluster of first and second planet gears thereon, the first planet gears meshing with the fixed ring gear and the second planet gears meshing with the output ring gear. The mesh of the planet gears with the ring gears comprises the sole support for the carrier. A sun gear is splined to the input shaft and meshes with one planet gear of each cluster.

20 Claims, 14 Drawing Figures

FIG.2

Patented Aug. 29, 1972 3,686,978

INVENTORS:
JOHN C. KNOBLOCH,
RAY M. SHEPARD,

BY Hood, Gust, Irish, Lundy & Coffey
ATTORNEYS.

Patented Aug. 29, 1972

INVENTORS:
JOHN C. KNOBLOCH,
RAY M. SHEPARD,

BY [signature]
ATTORNEYS.

FIG. 8

INVENTORS:
JOHN C. KNOBLOCH,
RAY M. SHEPARD,

ATTORNEYS.

Patented Aug. 29, 1972 3,686,978

INVENTORS:
JOHN C. KNOBLOCH,
RAY M. SHEPARD,

By *[signature]*

ATTORNEYS.

Patented Aug. 29, 1972

INVENTORS:
JOHN C. KNOBLOCH,
RAY M. SHEPARD,
By *[signature]*
ATTORNEYS.

PLANETARY REDUCTION WHEEL HUB

BACKGROUND OF THE INVENTION

1. Field of the Invention

This invention relates generally to planetary reduction drives, and more particularly to a planetary reduction drive for a vehicle wheel.

2. Description of the Prior Art

Certain types of wheeled vehicles, such as earth movers, mine shuttle cars, lumber transfer vehicles and agricultural implements employ so called "motorized wheels," i.e., a selfcontained power drive for each wheel comprising an electric or hydraulic driving motor and a gear reduction unit generally accommodated within the hub of the wheel. In certain prior powered wheel hubs, the motor and gear train are integrated in a single assembly thus necessitating removal of the entire wheel in order to repair or replace the motor and providing a complex mechanism which is difficult to assemble and disassemble. Other prior powered wheel hubs have required a specially designed driving motor and cannot readily be adapted for use with a different motor. Prior powered wheel hubs have generally employed a planetary reduction gear train however, change of the gear ratio in the field has either been impossible or has necessitated substantial disassembly and reassembly of the gear train.

It is therefore desirable to provide a powered wheel hub employing a standard drive motor which can readily be replaced without removal of the hub and wheel, in which the gear ratio may readily be changed in the field, and which is generally characterized by its simplicity and ease of assembly and disassembly.

SUMMARY OF THE INVENTION

A planetary reduction drive which comprises a mounting flange having a hollow spindle extending outwardly from one side thereof, means for securing the flange to a support member such as a vehicle frame element, and means for mounting a drive motor on the other side of the flange with its output shaft extending into the spindle. An input shaft coaxial with the motor shaft has a first portion extending into the spindle and a second portion extending outwardly from the outer end of the spindle, and means are provided for coupling the first portion of the input shaft to the motor shaft. A fixed ring gear coaxially surrounds the second portion of the input shaft and is secured to the spindle adjacent its outer end. A housing is provided having a first hub portion surrounding and rotatably mounted on the spindle, a second hub portion surrounding the fixed ring gear, and means for mounting a rotatable driven element, such as a wheel. An output ring gear coaxially surrounds the second portion of the input shaft outwardly from the fixed ring gear and is secured to the second hub portion of the housing. A planet carrier is disposed within the ring gears and supports at least two planet shafts, each of the planet shafts having a cluster of first and second planet gears thereon connected to rotate in unison, with the first planet gears meshing with the fixed ring gear and the second planet gears meshing with the output ring gear, the mesh of the planet gears with the ring gears providing the sole support for the carrier. At least one sun gear is provided on the second portion of the input shaft and meshing with one planet gear of each cluster, and means are provided for connecting the sun gear to the second portion of the input shaft for rotation therewith.

It is accordingly an object of the invention to provide an improved planetary reduction drive.

Another object of the invention is to provide an improved planetary reduction wheel hub.

A further object of the invention is to provide an improved planetary reduction drive wherein the drive motor may readily be replaced and the gear reduction ratio changed without substantial disassembly of the drive.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENTS

Referring now to FIGS. 1 through 7 of the drawings, the planetary reduction drive hub of the invention, generally indicated at 20, comprises six readily assembled and disassembled major components, i.e., spindle and hub assembly 22, 24, fixed ring gear 26, planet carrier and gear cluster assembly 28, output ring gear 30, splined shaft and sun gear assembly 32, and cover 34. Mounting flange 36 of spindle 22 is removably secured to frame element 38 of the vehicle by threaded fasteners 40. Drive motor 42, commonly a hydraulic motor, is removably secured to flange 36 by threaded fasteners 44 and has its splined output shaft 46 extending into hollow spindle 48 and removably coupled to splined input shaft 50 by splined coupling 78. Wheel 54 having tire 56 thereon is removably secured to flange 58 of hub 24 by threaded fasteners 60.

Referring now more particularly to FIGS. 2 through 7, spindle assembly 22 comprises mounting flange 36 having hollow spindle 48 extending outwardly from one side thereof. Flange 36 is secured to vehicle frame element 38 by threaded fasteners 40, opening 62 in element 38 receiving boss 64 of flange 36. Flange 66 of motor 42 is secured to boss 64 by threaded fasteners 44, motor 42 having boss 68 received in recess 70 in flange 36. Splined output shaft 46 of motor 42 extends into hollow spindle 48.

Figure 1A:
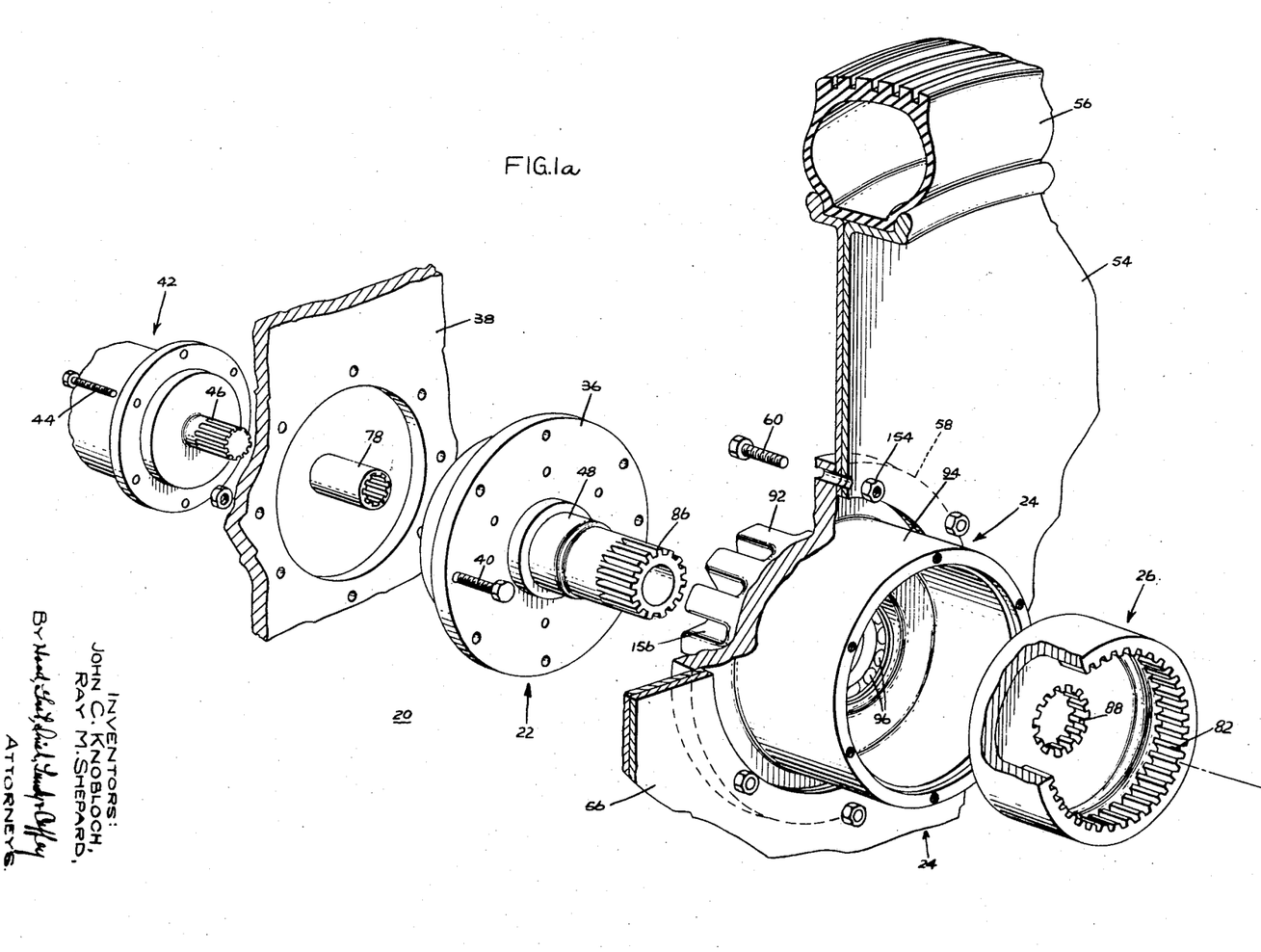
FIG. 1 composed of FIGS. 1A and 1B is an exploded, partially broken away, perspective view showing a powered wheel hub incorporating one embodiment of the invention.
Figure 1B:
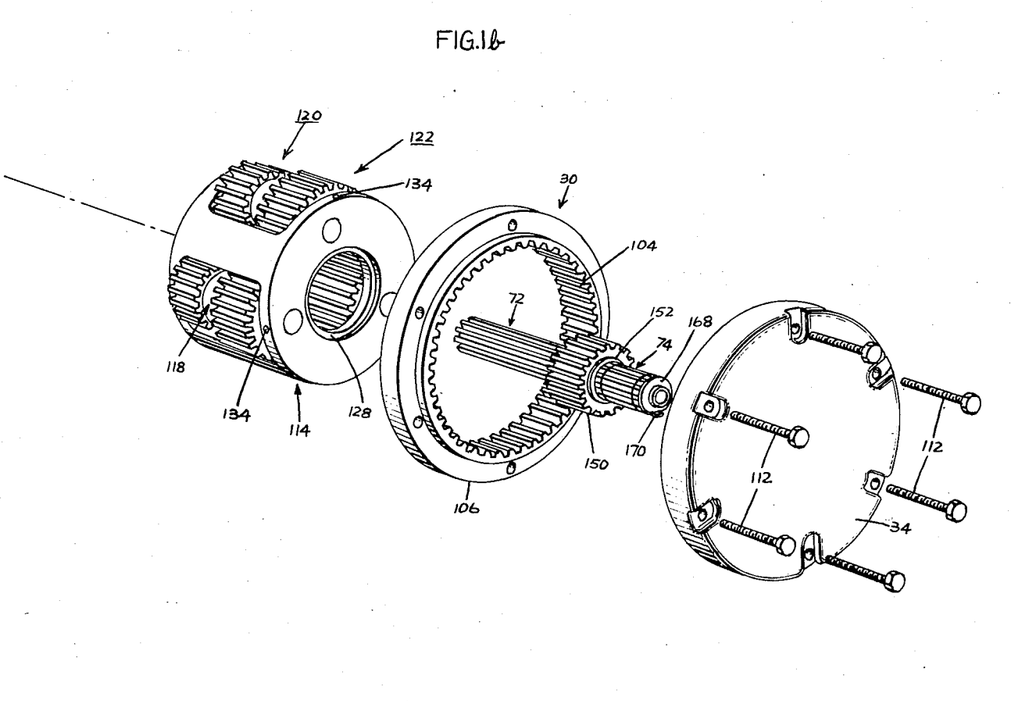
Figure 2:
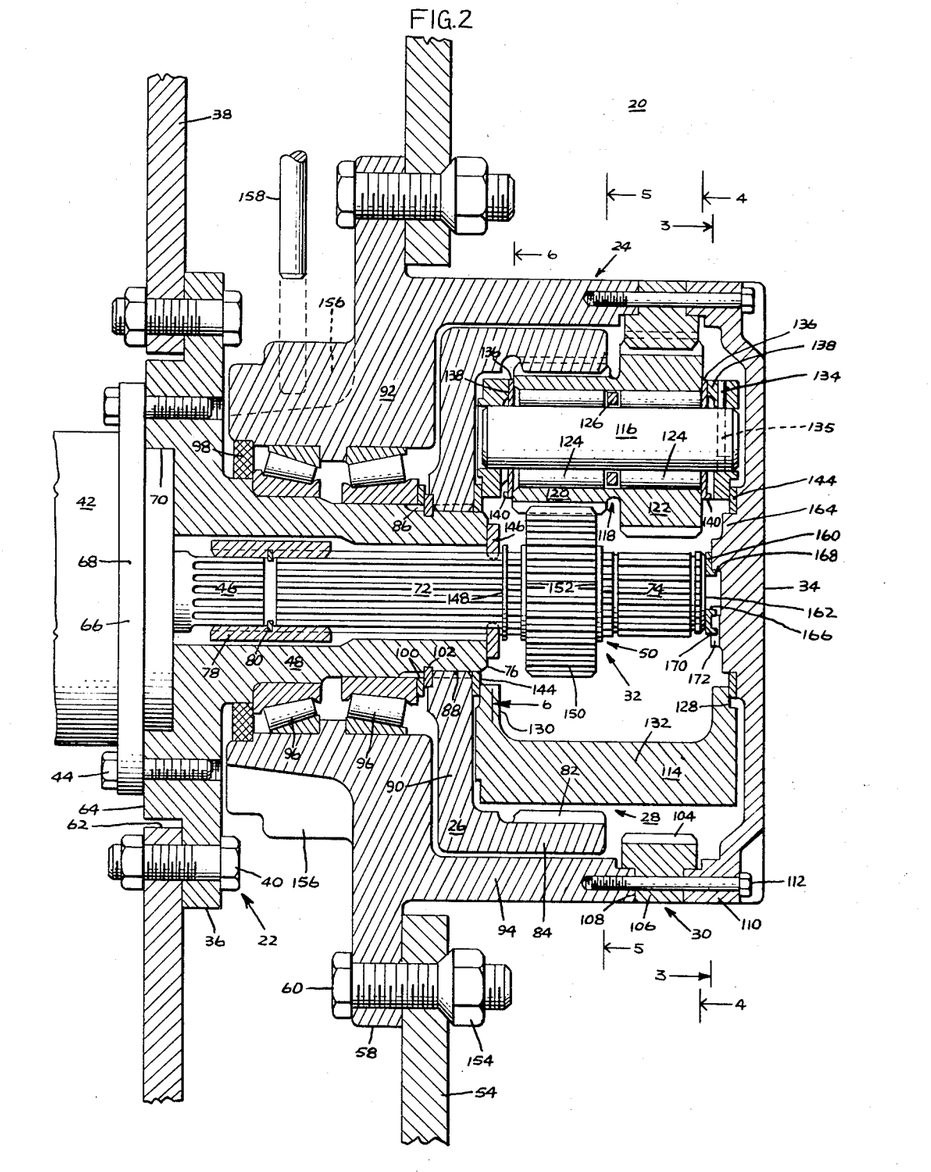
FIG. 2 is a side cross-sectional view showing the embodiment of FIG. 1.

Splined input shaft 50 has a first or inner portion 72 extending into hollow spindle 48 and a second or outer portion 74 extending outwardly from outer end 76 thereof. Motor shaft 46 and inner input shaft portion 72 are removably connected by splined coupling 78, snap ring 80 properly positioning coupling 78.

Fixed ring gear 26 comprises a cup-shaped member having internal ring gear teeth 82 formed on its side wall 84. Fixed ring gear 26 is removably mounted on hollow spindle 48 adjacent outer end 76 by a splined connection comprising external splines 86 on hollow spindle 48 and internal splines 88 in end wall 90.

Hub assembly 24 comprises first or inner hub portion 92 and second or outer hub portion 94. Inner hub portion 92 is rotatably mounted on hollow spindle 48 between end wall 90 of fixed ring gear 26 and flange 36 by roller bearings 96. Seal 98 prevents passage of lubricant out of inner hub portion 92. Outer hub portion 94 concentrically surrounds fixed ring gear 26. Spacer 100 and snap ring 102 retain bearings 96 and hub assembly 24 in assembled relationship on hollow spindle 48. Spacer 146 has a splined connection with splined input shaft 50, spacer 146 abutting outer end 76 of hollow spindle 48 and being retained in position by snap ring 148.

Output ring gear 30 comprises internal ring gear teeth 104 formed on annular ring member 106. Ring 106 abuts outer end 108 of outer hub portion 94. Cover 34 has rim portion 110 which abuts ring 106. Cover 34 and output ring gear 30 are removably secured to outer hub portion 94 by threaded fasteners 112.

Planet carrier 114 is coaxially positioned within ring gears 26, 30 and rotatably supports three planet shafts 116. Each of the planet shafts 116 has a gear cluster 118 thereon comprising first and second integrally formed planet gears 120, 122 which rotate in unison. Gear clusters 118 are rotatably supported on planet shafts 116 by roller bearings 124 having spacer 126 therebetween.

Figure 3:
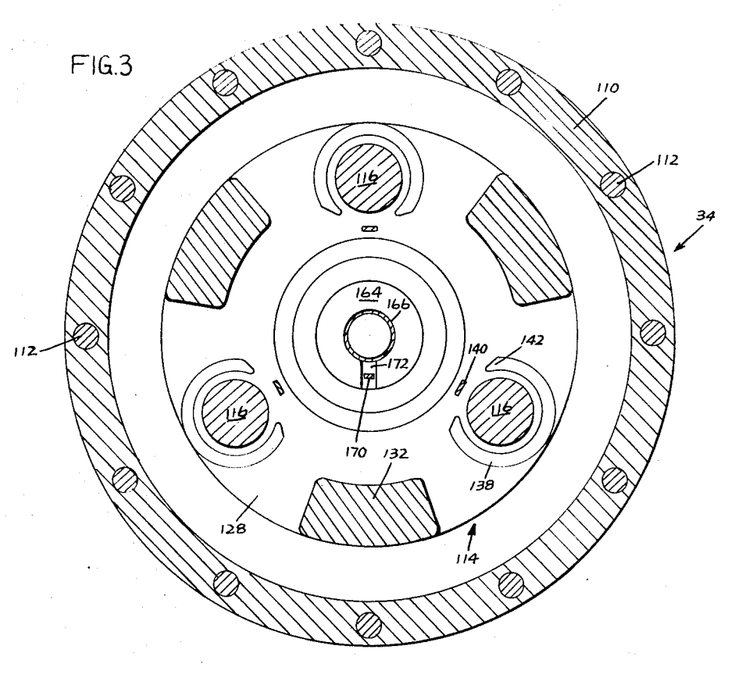
FIG. 3 is a cross-sectional view taken generally along the line 3—3 of FIG. 2.
Figure 4:
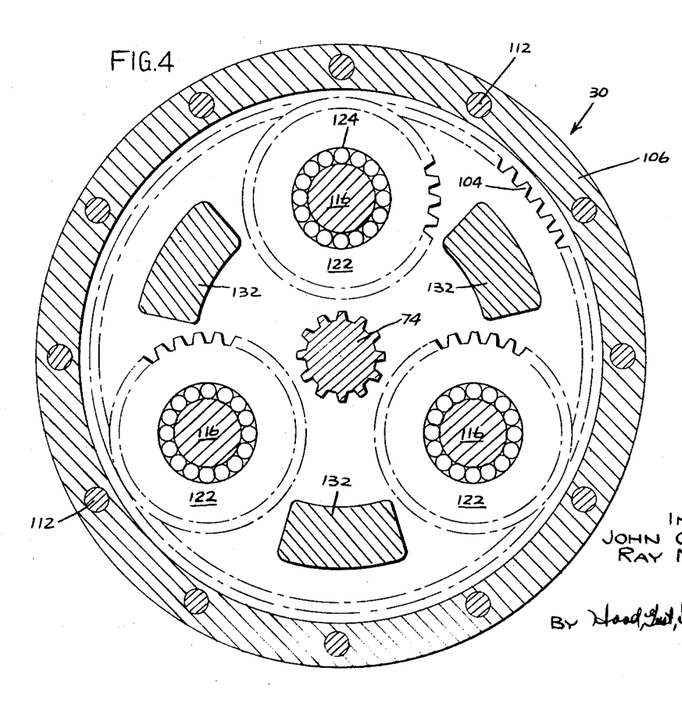
FIG. 4 is a cross-sectional view taken generally along the line 4—4 of FIG. 2.
Figure 5:
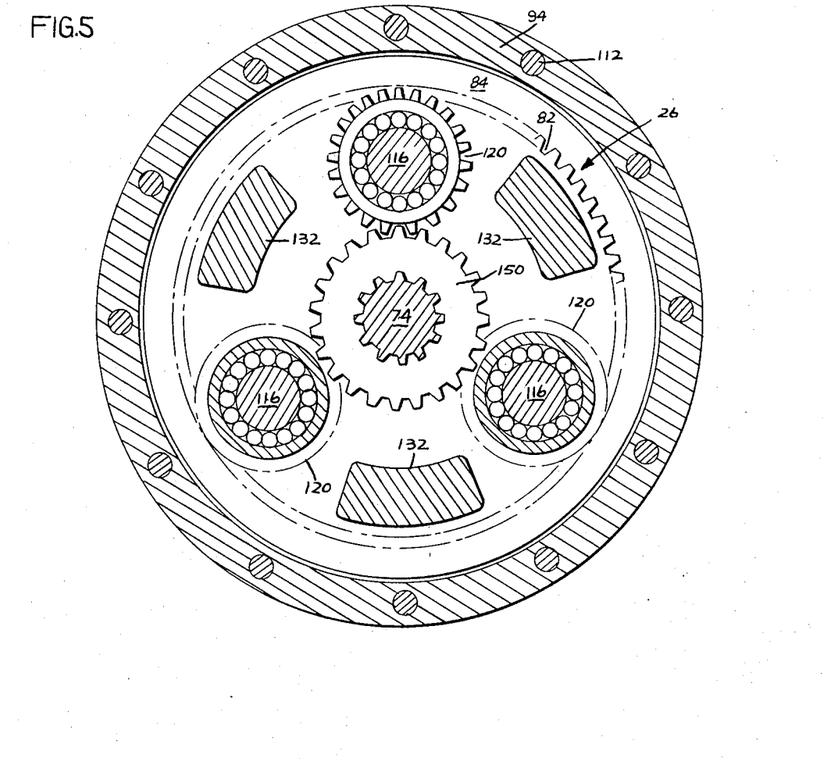
FIG. 5 is a cross-sectional view taken generally along the line 5—5 of FIG. 2.
Figure 6:
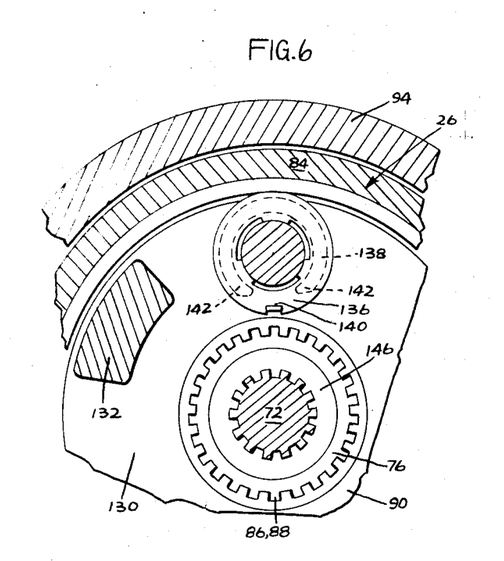
FIG. 6 is a fragmentary cross-sectional view taken generally along the line 6—6 of FIG. 2.

Planet shafts 116 extend between and are supported by end walls 128, 130 of carrier 114, end walls 128, 130 being integrally connected by webs 132 disposed between gear clusters 118, as best seen in FIGS. 3 through 6. Planet shafts 116 are secured against rotation and axial movement by roll pins 134. Thrust washers 136 are positioned between the opposite ends of gear clusters 118 and C-shaped bosses 138 formed on end walls 128, 130 of carrier 114, as best seen in FIGS. 2, 3 and 6. Thrust washers 136 have inwardly formed tangs 140 which extend between ends 142 of bosses 138 (FIGS. 3 and 6) thereby preventing rotation of thrust washers 136 with rotation of gear clusters 118 and reducing wear of bosses 138. Thrust washers 144 are positioned between carrier end wall 128 and cover 34 and carrier end wall 130 and end wall 90 of fixed ring gear 26, respectively. First planet gears 120 mesh with teeth 82 of fixed ring gear 26 and second planet gears 122 mesh with teeth 104 of output ring gear 30. As illustrated in FIGS. 2 through 6, sun gear 150 has a splined connection with outer portion 74 of splined input shaft 50 and meshes with first planet gears 120, sun gear 150 being retained in position by snap rings 152. It will be seen that the mesh of planet gears 120, 122 with ring gears 26, 30 provides the sole support for carrier 114.

Flange 58 is formed on hub assembly 24 generally intermediate inner hub portion 92 and outer hub portion 94. Wheel 54 is removably mounted on flange 58 by threaded fasteners 60 having conventional lugs 154 thereon. The outer surface of inner hub portion 92 preferably has a plurality of angular spaced slots 156 formed therein. Pin 158 may be inserted in a slot 156, as shown by the dashed lines in FIG. 2, thereby to provide a parking brake. Thrust washer 160 is positioned between outer end 162 of splined shaft 50 and boss 164 on cover 34, thrust washer 160 having flange 166 seated in opening 168 in boss 164. Thrust washer 160 also has tang 170 extending into slot 172 in boss 164 for preventing rotation of thrust washer 160 with rotation of splined input shaft 50 and thus inhibiting wear of boss 164.

Figure 7:
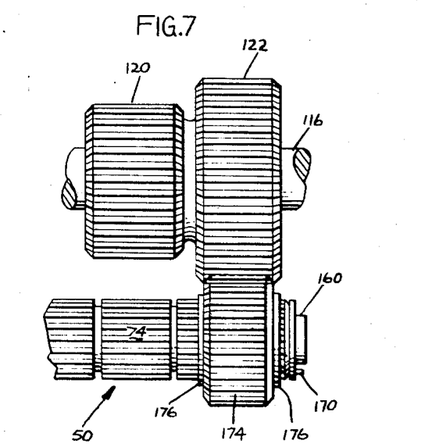
FIG. 7 is a fragmentary side view showing the drive of the previous figures with the sun gear meshing with the second planet gears.

Referring now additionally to FIG. 7 it will be seen that sun gear 150 of the previous figures has been removed from outer portion 74 of splined shaft 50 and a different sun gear 174 positioned thereon in mesh with second planet gears 122, sun gear 174 being retained on splined input shaft portion 74 by snap rings 176. In order to substitute sun gear 174 for sun gear 150 and thereby change the gear ratio, it is merely necessary to remove threaded fasteners 112 thus permitting removal of cover 34 and output ring gear 30, then to remove planet carrier and gear cluster assembly 28 bodily, and finally to remove splined input shaft and sun gear assembly 32 bodily. Snap rings 152 may then be removed thus permitting removal of sun gear 150 from portion 74 of splined shaft 50. Sun gear 174 may then be positioned on portion 74 of splined shaft 50 and retained by snap rings 176, and remaining components reassembled in reverse sequence.

It will further be seen that a wide range of gear ratios may be provided without removing hub assembly 24 and wheel 54 from spindle assembly 22. Thus, an output ring gear 30 having a different number of internal teeth 104 may readily be substituted by merely removing threaded fasteners 112 and cover 34. Further, upon removal of cover 34, output ring gear 30 and planet carrier and gear cluster assembly 28, fixed ring gear 26 may readily be removed from hollow spindle 48 and another fixed ring gear 26 having a different number of internal teeth 82 substituted therefor. Finally, by driving roll pins 134 completely into holes 135 in planet shafts 116, the planet shafts may be removed from carrier 114, gear clusters 118 removed, and other gear clusters having different numbers of teeth on planet gears 120, 122 substituted therefor. After driving roll pins 134 completely into holes 135 and removing planet shafts 116, roll pins 134 may then be driven out of holes 135 and reassembled as shown in FIG. 2. The following tabulation shows a number of different gear ratios provided with five different output ring gears 30, six different sun gears 150, 174 and five different gear clusters 118 employing five different planet gears 122, each of the five different gear clusters 118 employing the same number of teeth in planet gears 120. Only one fixed ring gear 26 is employed:

GEAR REDUCTION RATIOS

|  | 18.7/1 | 21.2/1 | 24.4/1 | 29.0/1 | 30.0/1 | 31.8/1 | 34.5/1 | 38.5/1 | 47.1/1 | 55.7/1 |
|---|---|---|---|---|---|---|---|---|---|---|
| Fixed ring gear 26 | 79 | 79 | 79 | 79 | 79 | 79 | 79 | 79 | 79 | 79 |
| Planet gear 120 | 25 | 25 | 25 | 25 | 25 | 25 | 25 | 25 | 25 | 25 |
| Planet gear 122 | 33 | 32 | 31 | 30 | 33 | 32 | 31 | 30 | 28 | 28 |
| Output ring gear 30 | 87 | 86 | 85 | 84 | 87 | 86 | 85 | 84 | 82 | 82 |
| Sun gear 150 | 29 | 29 | 29 | 29 |  |  |  |  | 29 |  |
| Sun gear 174 |  |  |  |  | 21 | 22 | 23 | 24 |  | 26 |

It will be readily apparent that by providing a number of different ring gears 26 having different numbers of teeth and an additional number of gear clusters 118 having planet gears 120 with different numbers of teeth, a much wider range of gear reduction ratios may be provided. FIGS. 2 through 7 of the drawings are roughly to onehalf scale. A planetary reduction drive hub as shown in FIGS. 2 through 7 with gearing providing a gear reduction ratio of 34.5/1, as shown in the tabulation above, and with a hydraulic motor 42 having two cubic inch per revolution displacement operated at 4,500 psi, provided approximately 50,000 pound inches of output torque.

Figure 8:
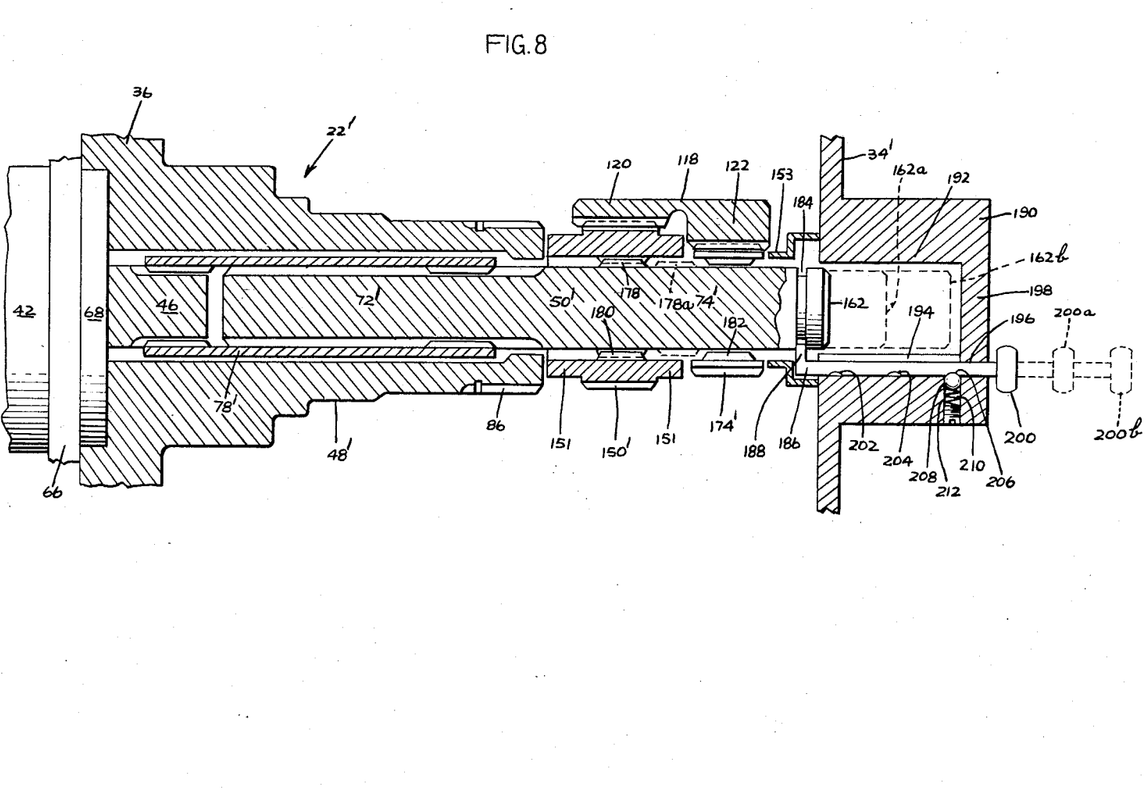
FIG. 8 is a fragmentary side cross-sectional view showing another embodiment of the invention which provides shifting between two gear ratios without any disassembly of the unit.

Referring now to FIG. 8 in which like elements are indicated by like reference numerals and similar elements by primed reference numerals, an elongated hollow spindle 48' is provided and inner portion 72' of input shaft 50' and splined coupling 78' are also elongated. Inner portion 72' of input shaft 50' is splined and outer portion 74' has a relatively short splined section 178 thereon. Two sun gears 150' and 174' are provided at all times respectively in mesh with planet gears 120, 122 of gear clusters 118. Sun gears 150', 174' have internally splined sections 180, 182, respectively. Sun gear 150' has spacing portions 151 on its opposite sides. Spacer 153 locates sun gear 174'.

Annular groove 184 is formed in outer portion 74' of input shaft 50' adjacent outer end 162 and shift actuating member 186 has end portion 188 received in groove 184. Cover 34' has an outwardly projecting hub portion 190 with a recess 192 formed therein coaxially with input shaft 50'. Actuating member 186 extends through and is slideably received in slot 194 in recess 192 and opening 196 in end wall 198 of hub 190. Actuating knob 200 is attached to the end of actuating member 186. Actuating member 186 has three spaced-apart detent notches 202, 204 and 206 formed therein, and a detent ball 208 biased inwardly by spring 210 is seated in opening 212 in hub 190.

It will now be seen that with actuating member 186 positioned forwardly as shown in solid lines in FIG. 8, input shaft 50' will be positioned forwardly with its splined section 178 drivingly engaging splined section 180 on sun gear 150'. Sun gear 150' thus drives planet gears 120. Sun gear 174', being disengaged, merely free-wheels in response to rotation of gear clusters 118. Actuating member 186 and input shaft 50' are maintained in this position by engagement of detent notch 206 with detent ball 208.

Actuation of actuating member 186 rearwardly to the position as shown in dashed lines at 200a will move outer end 162 of input shaft 50' rearwardly into recess 192 to the position shown in dashed lines at 162a, actuating member 186 and input shaft 50' being retained in this position by engagement of detent notch 204 with detent ball 208. In this position, splined section 178 on outer portion 74' of input shaft 50' is positioned between splined sections 180, 182 of sun gears 150', 174', as shown in dashed lines at 178a, thus providing a neutral position. Further rearward movement of actuating member 186 to the position shown in dashed lines at 200b thus moving outer end 162 of input shaft 50' rearwardly to the position shown in dashed lines at 162b will move splined section 178 of outer portion 74' of input shaft 50' into engagement with splined section 182 of sun gear 174', engagement of detent notch 202 with detent ball 208 retaining actuating member 186 and splined shaft 50' in this position. In this position, sun gear 174' is driven thus driving planet gears 122. Sun gear 150', being disengaged from outer portion 74' of input shaft 50' is free-wheeling. It will be seen that the elongated splined coupling 78' permits this axial shifting of inner portion 72' of input shaft 50'.

Figure 9:
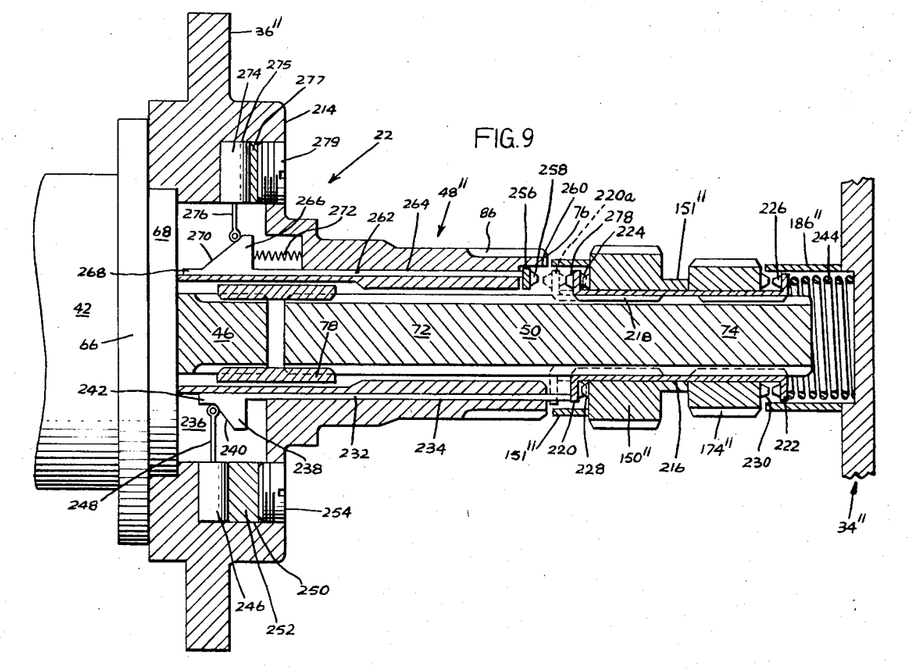
FIG. 9 is a fragmentary side cross-sectional view showing another embodiment of the invention incorporating a remotely controlled gear shifting mechanism.

Referring now to FIG. 9 in which like elements are again indicated by like reference numerals and similar elements by double primed reference numerals, flange 36" of spindle assembly 22 has an enlarged boss 214 formed thereon from which hollow spindle 48" extends. Sleeve 216 surrounds outer portion 74 of splined input shaft 50 and has a splined connection therewith, as at 218. Sun gears 150" and 174" are rotatably mounted on sleeve 216. Flanges 220, 222 are respectively formed on the opposite ends of sleeve 216 and respectively have clutch teeth 224, 226 formed thereon. Cooperating clutch teeth 228, 230 are formed on the sides of sun gears 150", 174". Spacing portions 151" and spacer 186" locate sun gears 150", 174".

Sleeve 216 is shifted axially from a position in which its clutch teeth 224 drivingly engage clutch teeth 228 on sun gear 150", as shown in solid lines in FIG. 9, to a position in which its clutch teeth 226 drivingly engage clutch teeth 230 on sun gear 174", as shown in dashed lines at 220a, by push rod 232 engaging flange 220 on sleeve 216 and extending axially through opening 234 in spindle 48" into cavity 236 in boss 214. Projection 238 having cam surface 240 thereon is formed on inner end 242 of push rod 232 in cavity 236. Spring 244 normally biases sleeve 216 to position 220a in which teeth 226 drivingly engage teeth 230 on sun gear 174".

Remotely controlled actuator 246, which may be a fluid power cylinder or a solenoid, has extensible element 248 engaging cam surface 240. Thus, remote actuation of actuator 246 to extend element 248 will move push rod 232 toward the right as viewed in FIG. 9 so as to cause teeth 224 drivingly to engage teeth 228 on sun gear 150". Actuator 246 is retained in opening 250 communicating with cavity 236 by spacer 252 and threaded plug 254.

A parking brake may also be employed in conjunction with the shifting mechanism shown in FIG. 9. Member 256 having teeth 258 thereon is normally accommodated in recess 260 in end 76 of hollow spindle 48". Push rod 262 is connected to member 256 and extends axially through opening 264 in spindle 48" into cavity 236. Projection 266 on end 268 of push rod 262 has cam surface 270 thereon. Spring 272 normally biases push rod 262 so as to position member 256 and teeth 258 in recess 260. Remotely controlled fluid power or solenoid actuator 274 has extensible element 276 cooperatively engaging cam surface 270. Flange 220 of sleeve 216 has braking teeth 278 on its outer surface. Remote actuation of actuator 274 to extend element 276 will move push rod 262 toward the right as viewed in FIG. 9 thus moving teeth 258 on member 256 into engagement with teeth 278 on sleeve 216, further moving sleeve 216 toward the right against spring 244 thereby causing teeth 224 to engage teeth 228 on sun gear 150". Thus, sun gear 150" is locked against rotation thereby locking the entire gear train. Actuator 274 is retained in opening 275 communicating with cavity 236 by spacer 277 and threaded plug 279.

Figure 10:
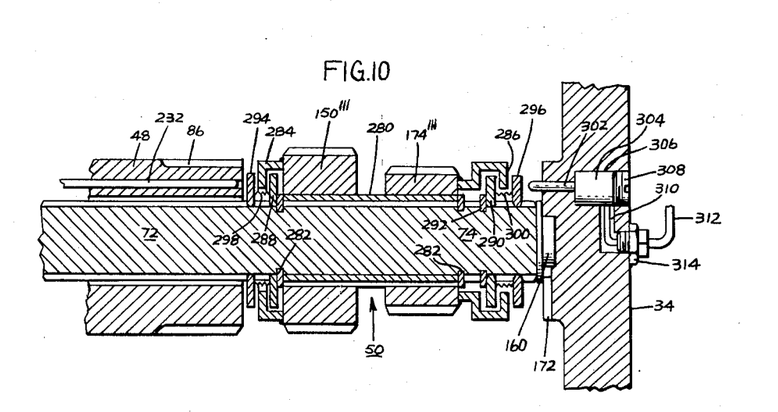
FIG. 10 is a fragmentary side cross-sectional view showing yet another embodiment of the invention incorporating another remotely controlled gear shifting mechanism.

Referring now to FIG. 10 in which like elements are again indicated by like reference numerals and similar elements by triple primed reference numerals, sleeve 280 surrounds outer portion 74 of splined shaft 50, being retained thereon by snap rings 282. Sun gears 150''', 174''' are rotatably mounted on sleeve 280. Sun gears 150''', 174''' respectively have driven clutch discs 284, 286 secured thereto, as by welding, and respectively spaced from their outer faces. Stationary clutch discs 288, 290 are splined on outer portion 74 of splined input shaft 50, respectively abutting snap rings 282, and 292. Pressure clutch discs 294, 296 respectively have splined connections with outer portion 74 of splined input shaft 50, driven discs 284, 286 being respectively positioned between stationary discs 288, 290 and pressure discs 294, 296. Stationary discs 288, 290 and pressure discs 294, 296 are respectively normally biased apart by springs 298, 300.

Pressure disc 294 is moved toward the right as viewed in FIG. 10 thereby to engage driven disc 284 and to move it and sun gear 150''' slightly toward the right so that disc 284 engages stationary disc 288, by push rod 232 which may be remotely actuated by actuator 246 (FIG. 9). Thus, actuation of push rod 232 clamps driven disc 284 between stationary disc 288 and pressure disc 294, both of which are splined on input shaft 50, thus drivingly connecting sun gear 150''' to the input shaft.

Pressure disc 296 is moved toward the left as viewed in FIG. 10 thereby to engage driven disc 286 and to move it and sun gear 174''' slightly toward the left so that driven disc 286 engages stationary disc 290, by push rod 302 extended by actuator 304 seated in recess 306 in cover 34 and retained therein by threaded plug 308. Actuator 304 is shown as a fluid power cylinder having its pressure line 310 coupled to line 312 by rotatable coupling 314. Actuation of actuator 304 to extend push rod 302 will clamp driven disc 286 between stationary disc 290 and pressure disc 296, both of which are splined to outer portions 74 of splined input shaft 50, thus drivingly connecting sun gear 174''' to the input shaft. It will further be seen that simultaneous actuation of actuator 246 (FIG. 9) and actuator 304 will result in connecting both sun gears 150''' and 174''' to outer portion 74 of splined input shaft 50 thereby locking the gear train to provide a parking brake action.

Figure 11:
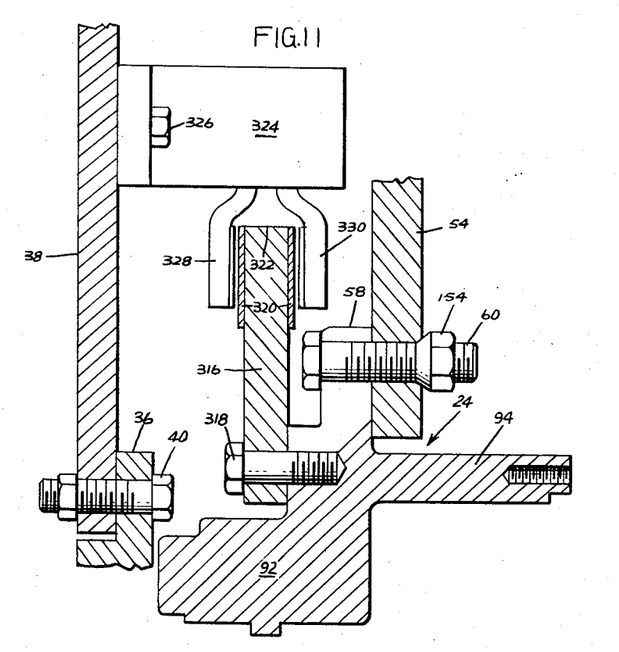
FIG. 11 is a fragmentary side cross-sectional view showing application of a braking system to the planetary reduction drive of the invention.

Referring now to FIG. 11 in which like elements are again indicated by like reference numerals, annular brake disc 316 may be secured to the side of flange 58 remote from wheel 54 by threaded fasteners 318, disc 316 having suitable brake face material 320 thereon adjacent its outer periphery 322. Caliper mechanism 324 is secured to frame element 38 by threaded fasteners 326 and has caliper arms 328, 330 straddling the peripheral region of disc 316. Braking action is provided by actuation of mechanism 324 to move caliper arms 328, 330 into braking engagement with braking surfaces 320 of brake disc 316.

Figure 12:
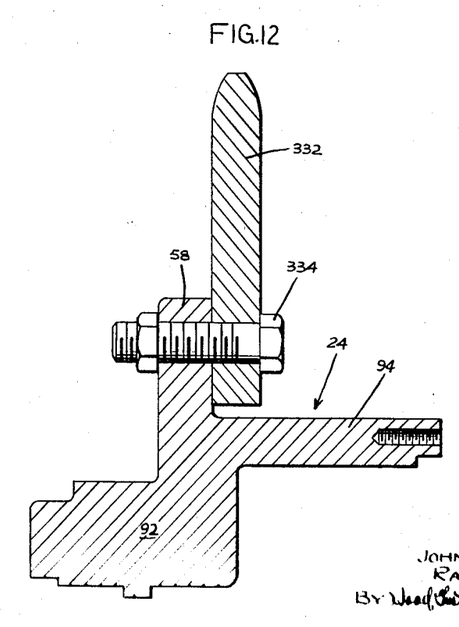
FIG. 12 is a fragmentary side cross-sectional view showing adaptation of the planetary reduction drive of the invention to drive a sprocket.

Referring now to FIG. 12 in which like elements are indicated by like reference numerals, the planetary reduction drive hub of the invention may be employed for driving rotatable driven elements other than wheels, such as the drum of a transit mix concrete mixer. Here, drive sprocket 332 is secured to flange 58 of hub assembly 24 by threaded fasteners 334, sprocket 332 in turn driving a chain (not shown) which drives another rotatable driven element.

Figure 13:
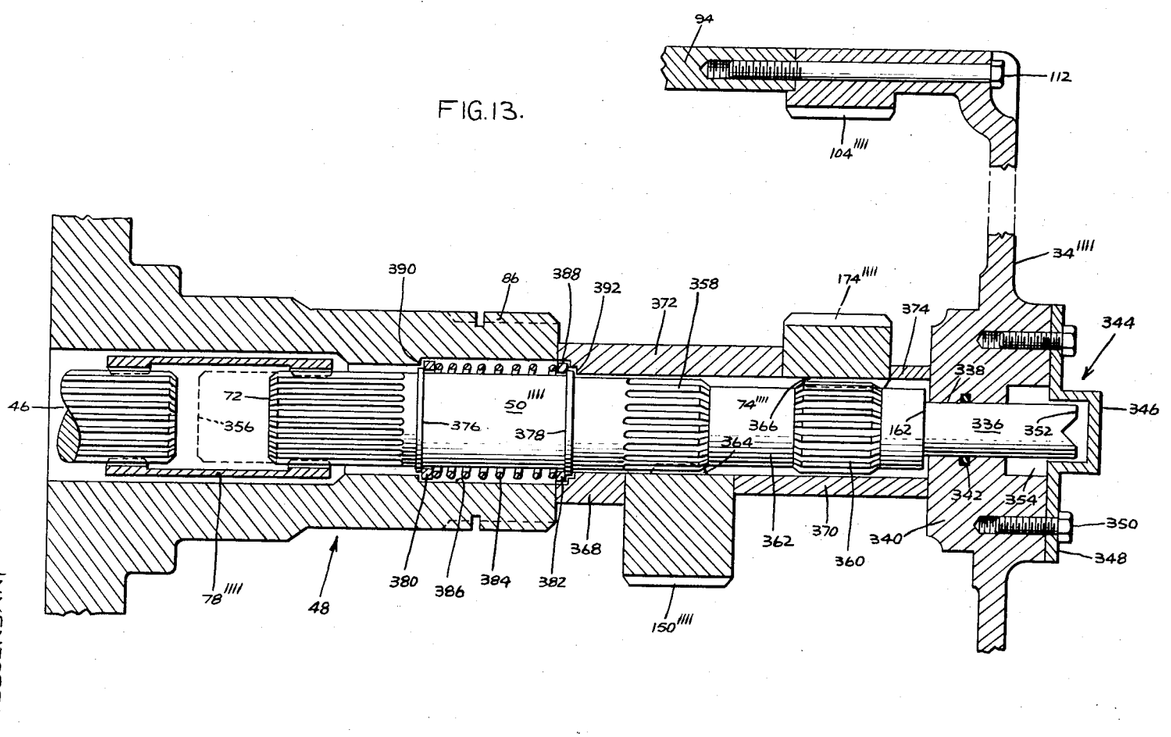
FIG. 13 is a fragmentary cross-sectional view showing a further embodiment of the invention incorporating a disconnect.

Referring now to FIG. 13 in which like elements are indicated by like reference numerals and similar elements by quadruple primed reference numerals, disconnect member 336 is provided which may be a separate element abutting end 162 of input shaft 50'''' or which may be formed as an integral extension of input shaft 50''''. Disconnect member 336 extends through opening 338 in hub portion 340 of cover 34'''', seal 342 preventing passage of lubricant along disconnect member 336. Disconnect cap 344 has hollow hub portion 346 and annular flange portion 348 removably secured to hub 340 by threaded fasteners 350. In the driving position of the drive, end 352 of disconnect member 336 extends into hub portion 346 of disconnect cap 344, as shown in FIG. 13. As will hereinafter be more fully described, in the disconnect or free-wheeling position of the drive, disconnect cap 344 is reversed so that hub portion 346 extends into cavity 354 in hub 340 thereby engaging end 352 of disconnect member 336 and moving it and input shaft 50'''' to the left, as viewed in FIG. 13, thereby positioning inner input shaft portion 72 as shown in dashed lines at 356. In this embodiment, output ring gear 104'''' is integrally formed on cover 34''''.

Outer portion 74'''' of input shaft 50'''' has two splined sections 358, 360 thereon with unsplined portion 362 therebetween. In the driving position of input shaft 50'''' as shown in FIG. 13, splined section 358 engages internal splines 364 on sun gear 150'''' when that sun gear is employed, and splined section 360 engages internal splines 366 on sun gear 174'''' when that sun gear is employed, it being understood that while both sun gears 150'''' and 174'''' are shown in FIG. 13, only one sun gear is utilized in the drive at any given time. Spacers 368, 370 locate sun gear 150'''' when that sun gear is employed, and spacers 372, 374 locate sun gear 174'''' when that sun gear is employed.

A pair of spaced-apart snap rings 376, 378 are seated in grooves on input shaft 50'''' between inner portion 72 and splined portion 58. Retaining rings 380, 382 are biased-apart by coil spring 384 and in the drive position of input shaft 50'''', respectively engage snap rings 376, 378. Coil spring 384 and retainer rings 380, 382 are accommodated in recesses 386, 388 respectively formed in spindle 48 and in spacer 368 or 372, recesses 386, 388 respectively having shoulders 390, 392.

It will now be seen that when disconnect cap 344 is reversed as above described with hub portion 346 engaging end 352 of disconnect member 336, snap ring 378 engages retainer ring 382 thus compressing spring 384 against retainer ring 380 which engages shoulder 390 as inner end 72 of input shaft 50'''' moves to the left to the dashed line position 356. It will further be seen that upon such movement of shaft 50'''' to the disconnect position, splined section 358 will move to the left out of engagement with splines 364 of sun gear 150'''' if that sun gear is employed, or splined section 360 will move to the left out of engagement with splines 366 of sun gear 174'''' if that sun gear is employed, thus permitting free-wheeling of the planetary reduction drive.

Assuming that disconnect cap 344 has been reversed thereby shifting input shaft 50'''' to its disconnect position, as above-described, upon removal of disconnect cap 344 by removing threaded fasteners 350, spring 384 acting upon retainer ring 382 and snap ring 376 will bias input shaft 50'''' toward the right to its drive position, as shown in FIG. 13. It will be noted that in the drive position, spring 384 acts between snap rings 376, 378 and thus applies no force to the input shaft 50''''.

It will now be seen that drive motor 42 may readily be removed for repair and replacement by merely removing threaded fasteners 44 without the necessity for moving wheel 54 and drive hub 20. It will further be seen that gear ratios may readily be changed again without the necessity for removing the entire wheel and drive hub assembly and in particular, without extensive disassembly and reassembly of the gear train.

While there have been described above the principles of this invention in connection with specific apparatus, it is to be clearly understood that this description is made only by way of example and not as a limitation to the scope of the invention.

What is claimed is:

1. A planetary reduction drive comprising: a mounting flange having a hollow spindle extending outwardly from one side thereof, said spindle having an outer end, means for securing said flange to a support member, and means for mounting a drive motor on the other side of said flange with its output shaft extending into said spindle; an input shaft coaxial with said motor shaft having a first portion extending into said spindle and a second portion extending outwardly from said outer end thereof; means for coupling said first portion of said input shaft to said motor shaft; a fixed ring gear coaxial with and surrounding said second portion of said input shaft, and means for securing said fixed ring gear to said spindle adjacent said outer end thereof; a housing having a first hub portion surrounding and rotatably mounted on said spindle, a second hub portion surrounding said fixed ring gear, and means for mounting a rotatable driven element on said housing; an output ring gear coaxial with and surrounding said second portion of said input shaft, secured to said second hub portion of said housing, and spaced outwardly from said fixed ring gear; a planet carrier within said ring gear and supporting at least two planet shafts in spaced, parallel relationship with said second portion of said input shaft, each of said planet shafts having a cluster of first and second planet gears thereon connected to rotate in unison, said first planet gears meshing with said fixed ring gear and said second planet gears meshing with said output ring gear; at least one sun gear on said second portion of said input shaft and meshing with one planet gear of each cluster; and means for connecting said sun gear to said second portion of said input shaft for rotation therewith.

2. The drive of claim 1 wherein the mesh of said planet gears with said ring gears comprise the sole support for said carrier.

3. The drive of claim 1 wherein said coupling means removably couples said input shaft to said motor shaft and said securing means removably secures said fixed ring gear to said spindle, said output ring gear being removably secured to said second hub portion of said housing.

4. The drive of claim 3 wherein said fixed ring gear is carried on the side wall of a cup-shaped member, said cup-shaped member having an end wall, said securing means comprising a splined connection between said end wall and said spindle.

5. The drive of claim 3 wherein said second hub portion has an outer end, and further comprising means for removably securing said output ring gear to said outer end of said second hub portion.

6. The drive of claim 5 further comprising a cover member having a rim portion abutting said output ring gear, said last-named securing means comprising threaded fasteners securing said cover member and output ring gear to said outer end of said second hub portion.

7. The drive of claim 1 wherein said connecting means comprises a splined connection between said second portion of said input shaft and said sun gear.

8. The drive of claim 7 wherein said splined connection comprises external splines extending substantially the length of said second portion of said input shaft, and mating internal splines on said sun gear removably connecting the same to said external splines whereby a selected sun gear may be selectively meshed with the first or second planet gears of said clusters.

9. The drive of claim 1 wherein said motor shaft and first portion of said input shaft respectively have external splines thereon, said coupling means comprising an internally splined sleeve removably coupling said shafts, said fixed ring gear being carried on the side wall of a cup-shaped member, said cup-shaped member having an end wall, said securing means comprising a splined connection removably connecting said end wall to said spindle, said second hub portion having an outer end, said output ring gear being carried by an annular member abutting said outer end of said second hub portion, and further comprising a cover member having a rim portion abutting said annular member, threaded fasteners removably securing said cover member and annular member to said outer end of said second hub portion, and bearing means rotatably mounting said first hub portion on said spindle intermediate said end wall of said cup-shaped member and said plate member.

10. The drive of claim 9 wherein said second portion of said hub member, said annular member, and said rim portion of said cover member define a continuous cylindrical outer surface.

11. The drive of claim 1 wherein said driven element mounting means comprises an annular flange intermediate said first and second hub portions of said housing.

12. The drive of claim 1 wherein there are two of said sun gears respectively in mesh with said first and second planet gears, said connecting means comprising means for selectively connecting one or the other of said sun gears to said second portion of said input shaft thereby providing two different speed reduction ratios for said drive.

13. The drive of claim 12 wherein each of said sun gears has internal splines thereon, said second portion of said input shaft having an externally splined section, said selective connecting means comprising means for axially shifting said input shaft between a first position with said splined section engaging the internal splines of one of said pinions and a second position with said splined section engaging the internal splines of the other of said pinions.

14. The drive of claim 13 wherein said shifting means has an intermediate position with said splined section of said input shaft spaced between said internal splines of said sun gears.

15. The drive of claim 12 wherein said selective connecting means comprises an axially movable sleeve surrounding and having a splined connection with said second portion of said input shaft and having opposite ends, said sun gears being rotatably mounted on said sleeve between said ends thereof, said sun gears respectively having clutch teeth on the sides thereof facing said ends of said sleeve, said sleeve having clutch teeth respectively formed on said opposite ends thereof, and means for selectively axially shifting said sleeve between a first position with the clutch teeth at one end thereof engaging the clutch teeth on one sun gear and with the clutch teeth at the other end disengaged from the clutch teeth on the other sun gear, and a second position with the clutch teeth at the other end of said sleeve engaging the clutch teeth on the other sun gear and the clutch teeth at said one end disengaged from the clutch teeth on said one sun gear.

16. The drive of claim 12 wherein said selective connecting means comprises first and second clutch means for respectively drivingly connecting said sun gears to said second portion of said input shaft.

17. The drive of claim 16 wherein said sun gears are rotatably mounted on said second portion of said input shaft, each of said clutch means comprising a driven clutch disc secured to the respective sun gear and spaced therefrom, a stationary clutch disc secured to said second portion of said input shaft between said driven disc and the respective sun gear, a pressure clutch disc having a splined connection with said second portion of said input shaft, said driven disc being disposed from said stationary disc and pressure disc, spring means for normally biasing said pressure and stationary discs away from engagement with said driven disc, and means for selectively moving said pressure disc toward said driven disc thereby drivingly to clamp said driven disc between said stationary and pressure discs.

18. The drive of claim 17 further comprising first actuator means mounted in said spindle for actuating the pressure disc of one of said clutch means, a cover member secured to said second hub portion of said housing, and second actuator means mounted in said cover for actuating the pressure disc of the other of said clutch means.

19. The drive of claim 1 wherein said connecting means comprises a splined section on said input shaft and mating splines on said sun gear, said input shaft being axially movable between a drive position with said splined section engaging said sun gear splines, and a disconnected position with said splined section disengaged from said sun gear splines.

20. The drive of claim 19 further comprising spring means for normally biasing said input shaft to said drive position thereof, a cover member secured to said second hub portion, said cover member having a hub portion coaxial with said input shaft and having a coaxial opening therethrough, a disconnect member in said opening and axially movable therein with said input shaft between said positions thereof, and a disconnect cap removably secured to said cover member and covering said opening therein, said cap having a projection thereon, said cap being adapted to be secured to said cover member in a first position with said projection disengaged from said disconnect member, said spring means biasing said input shaft and disconnect member to said drive position in said first cap position, said cap being adapted to be secured to said cover member in a second position with said projection engaging said disconnect member and moving the same and said shaft to said disconnected position in said second cap position.

* * * * *